United States Patent
Qin

(10) Patent No.: US 11,386,586 B2
(45) Date of Patent: Jul. 12, 2022

(54) METHOD AND ELECTRONIC DEVICE FOR ADDING VIRTUAL ITEM

(71) Applicant: BEIJING DAJIA INTERNET INFORMATION TECHNOLOGY CO., LTD., Beijing (CN)

(72) Inventor: Wenyu Qin, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/086,798

(22) Filed: Nov. 2, 2020

(65) Prior Publication Data
US 2021/0134022 A1 May 6, 2021

(30) Foreign Application Priority Data
Oct. 31, 2019 (CN) .......................... 201911049234.4

(51) Int. Cl.
*G06V 40/16* (2022.01)
*G06T 11/00* (2006.01)

(52) U.S. Cl.
CPC ............ *G06T 11/00* (2013.01); *G06V 40/161* (2022.01); *G06V 40/168* (2022.01)

(58) Field of Classification Search
CPC . G06K 9/00281; G06K 9/00268; G06T 11/00
See application file for complete search history.

(56) References Cited

U.S. PATENT DOCUMENTS

| | | | |
|---|---|---|---|
| 6,775,403 B1* | 8/2004 | Ban | G06K 9/00201 382/118 |
| 9,971,735 B2* | 5/2018 | Clarkson | G06F 17/16 |
| 2011/0286665 A1* | 11/2011 | Umeda | H04N 1/6086 382/167 |
| 2015/0248581 A1* | 9/2015 | Gouda | G06T 19/006 345/633 |
| 2019/0098149 A1* | 3/2019 | Shinoda | G06K 9/00281 |
| 2019/0102603 A1* | 4/2019 | Du | G06N 20/00 |
| 2020/0082158 A1* | 3/2020 | Hussain | G06T 11/001 |

* cited by examiner

*Primary Examiner* — Yi Yang
(74) *Attorney, Agent, or Firm* — Knobbe, Martens, Olson & Bear, LLP

(57) ABSTRACT

A method for adding a virtual item can include: acquiring classification identifiers of a plurality of pixel points in a target human face image, wherein the classification identifier comprises a first identifier of pixel points in a first human face part or a second identifier of pixel points in a second human face part; determining a target region in the target human face image based on the classification identifiers, wherein the target region is a region belonging to the first human face part; adding a virtual item to the target region; wherein the first human face part comprises an uncovered human face part, and the second human face part comprises a covered human face part or a non-human face part.

20 Claims, 4 Drawing Sheets

---

Acquiring classification identifiers of a plurality of pixel points in a target human face image, wherein the classification identifier comprises a first identifier of pixel points in a first human face part or a second identifier of pixel points in a second human face part — 101

Determining a target region in the target human face image based on the classification identifiers, wherein the target region is a region belonging to the first human face part — 102

Adding a virtual item to the target region — 103

METHOD AND ELECTRONIC DEVICE FOR ADDING VIRTUAL ITEM

This application is based on and claims priority under 35 U.S.C. 119 to Chinese patent application No. 201911049234.4, filed on Oct. 31, 2019, in the China National Intellectual Property Administration, the disclosure of which is herein incorporated by reference in its entirety.

TECHNICAL FIELD

The present disclosure relates to the field of image processing and in particular relates to a method and electronic device for adding a virtual item.

BACKGROUND

With the rapid development of image processing technologies, adding a virtual item to a human face image has become a common way. By adding the virtual item to the human face image, the content of the human face image is enriched and the human face image is improved in beauty.

SUMMARY

The present disclosure provides a method and electronic device for adding a virtual item.

In one aspect of embodiments of the present disclosure, a method for adding a virtual item is provided. The method includes: acquiring classification identifiers of a plurality of pixel points in a target human face image, wherein the classification identifier includes a first identifier of pixel points in a first human face part or a second identifier of pixel points in a second human face part; determining a target region in the target human face image based on the classification identifiers, wherein the target region is a region belonging to the first human face part; and adding a virtual item to the target region; wherein the first human face part includes an uncovered human face part, and the second human face part includes a covered human face part or a non-human face part.

In another aspect of the embodiments of the present disclosure, an electronic device for adding a virtual item is provided. The electronic device includes: at least one processor; and a volatile or non-volatile memory configured to store at least one program including at least one instruction executable by the at least one processor.

Wherein the at least one instruction, when executed by the at least one processor, causes the at least one processor to perform a method including: acquiring classification identifiers of a plurality of pixel points in a target human face image, wherein the classification identifier includes a first identifier of pixel points in a first human face part or a second identifier of pixel points in a second human face part; determining a target region in the target human face image based on the classification identifiers, wherein the target region is a region belonging to the first human face part; and adding a virtual item to the target region; wherein the first human face part includes an uncovered human face part, and the second human face part includes a covered human face part or a non-human face part.

In yet another aspect of embodiments of the present disclosure, a non-transitory computer-readable storage medium at least one program including storing at least one instruction therein is provided. The at least one instruction, when executed by a processor of an electronic device, causes the electronic device to perform a method including: acquiring classification identifiers of a plurality of pixel points in a target human face image, wherein the classification identifier includes a first identifier of pixel points in a first human face part or a second identifier of pixel points in a second human face part; determining a target region in the target human face image based on the classification identifiers, wherein the target region is a region belonging to the first human face part; and adding a virtual item to the target region; wherein the first human face part includes an uncovered human face part, and the second human face part includes a covered human face part or a non-human face part.

In still another aspect of the embodiments of the present disclosure, a computer program product storing at least one program including at least one instruction is provided. The at least one instruction, when executed by a processor of an electronic device, causes the electronic device to perform a method including: acquiring classification identifiers of a plurality of pixel points in a target human face image, wherein the classification identifier includes a first identifier of pixel points in a first human face part or a second identifier of pixel points in a second human face part; determining a target region in the target human face image based on the classification identifiers, wherein the target region is a region belonging to the first human face part; and adding a virtual item to the target region; wherein the first human face part includes an uncovered human face part, and the second human face part includes a covered human face part or a non-human face part.

It should be understood that the above general descriptions and the following detailed descriptions only provide examples and are illustrative, and are not intended to limit the present disclosure.

BRIEF DESCRIPTION OF THE DRAWINGS

The accompanying drawings, which are incorporated in and constitute part of the description, illustrate embodiments of the present disclosure and, together with the description thereof, serve to explain the principles of the present disclosure.

DETAILED DESCRIPTION

Reference is now made in detail to various embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure.

Instead, they are merely examples of apparatuses and methods consistent with aspects related to the present disclosure as recited in the appended claims.

An embodiment of the present disclosure provides a method for adding a virtual item, which may add a virtual item to a target human face image and is applicable to various scenarios. For example, the method can be applied to a video call scenario, a communication connection by which a video call is made is established between any two terminals, any terminal acquires an image in a video as a human face image during the video call, and using the method according to this embodiment, a virtual item may be added to the human face image displayed on the terminal.

In some embodiments, the method may be applicable to a picture beautification scenario. A terminal acquires a human face image to be processed and displays the human face image, and using the method according to this embodiment, a virtual item may be added to the human face image displayed on the terminal.

In some embodiments, the method can be applicable to a live streaming scenario. An anchor records a video by a terminal and releases the recorded video for other users to view. The terminal of any user may add, using the method according to this embodiment, a virtual item to a human face image of the video.

Figure 1:
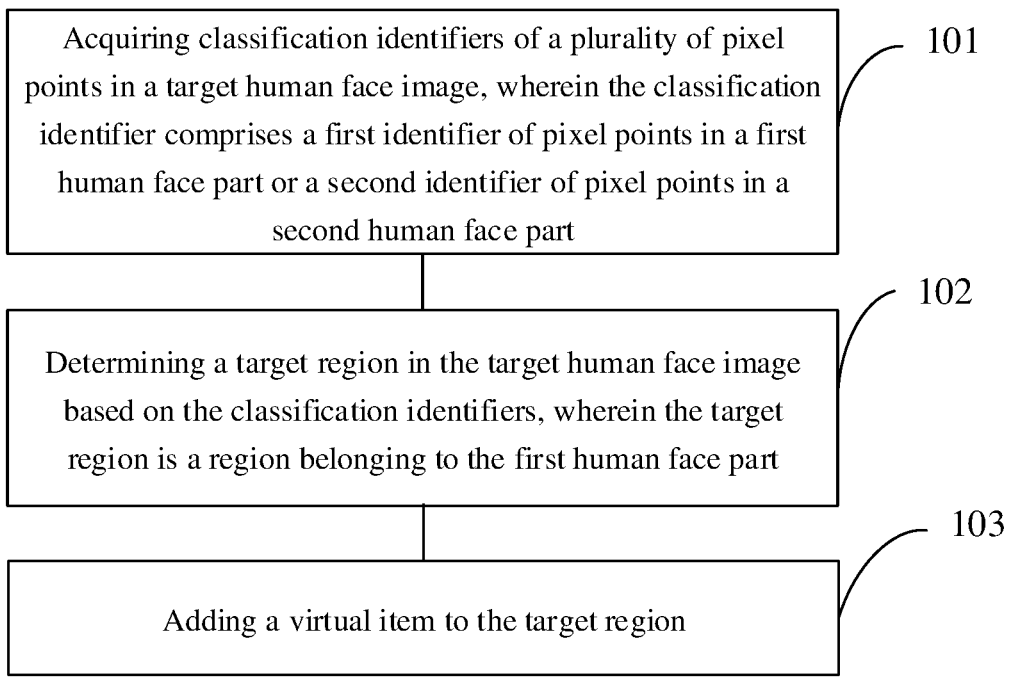
FIG. 1 is a flowchart showing a method for adding a virtual item according to an embodiment.

FIG. 1 is a flowchart showing a method for adding a virtual item according to an embodiment. As shown in FIG. 1, the method includes the following steps.

In 101, classification identifiers of a plurality of pixel points in a target human face image are acquired, wherein the classification identifier includes a first identifier of pixel points in a first human face part or a second identifier of pixel points in a second human face part.

In 102, a target region is determined in the target human face image based on the classification identifiers, wherein the target region is a region belonging to the first human face part.

In 103, a virtual item is added to the target region.

Wherein the first human face part includes an uncovered human face part, and the second human face part includes a covered human face part or a non-human face part.

The method according to this embodiment acquires the classification identifiers of the plurality of pixel points in the target human face image, and adds, based on the classification identifiers of the plurality of pixel points, the virtual item that matches the human face part to the target region in the target human face image, which belongs to the first human face part. When a region of the human face part is covered, the classification identifier of the covered region of the human face part should be the second identifier, such that the virtual item is not added to the covered face part after the region of the human face part is covered, and instead, the virtual item may only be added to a region corresponding to pixel points indicated by the first identifier.

In some embodiments, acquiring the classification identifiers of the plurality of pixel points in the target human face image includes: acquiring features of the target human face image by extracting the feature from the target human face image based on a pixel classification model; and determining the classification identifiers of pixel points in the target human face image based on the features of the target human face image.

In some embodiments, determining the target region in the target human face image includes: acquiring a first reference image based on the classification identifiers, wherein pixel values of pixel points in the first reference image are determined by the classification identifiers; determining a reference region in the first reference image, wherein the reference region includes pixel points with the first identifier; and determining the target region according to the reference region in the target human face image.

In some embodiments, acquiring the first reference image includes: determining a second reference image, wherein pixel values of pixel points in the second reference image are classification identifiers; and acquiring the first reference image by smoothing the second reference image.

In some embodiments, acquiring the classification identifiers of the plurality of pixel points in the target human face image includes: detecting key pixel points belonging to a human face part in the target human face image; determining a first human face image, wherein the first human face image includes a region composed by key pixel points; and determining classification identifiers of pixel points in the first human face image.

In some embodiments, determining the first human face image includes: acquiring edge pixel points of key pixel points in response to the key pixel points being located within a region of a human face part, wherein the edge pixel points are located on a contour of the human face part; and determining the first human face image including the region connected by the edge pixel points.

In some embodiments, determining the target region in the target human face image includes: acquiring a third reference image based on classification identifiers of pixel points in the first human face image, wherein pixel values of pixel points in the third reference image are determined based on the classification identifiers of pixel points in the first human face image; acquiring a fourth reference image by adding reference pixel points to outer side of the third reference image, wherein pixel values of the reference pixel points are the second identifier, the fourth reference image and the target human face image have the same size, and a location of each pixel point of the third reference image in the fourth reference image is the same as a location of a corresponding pixel point of the first human face image in the target human face image; determining a reference region in the fourth reference image; and determining, in the target human face image, a target region corresponding to the reference region, wherein the reference region includes pixel points with pixel values being the first identifier in the fourth reference image.

In some embodiments, acquiring the third reference image includes: determining a fifth reference image, wherein pixel values of pixel points in the fifth reference image are classification identifiers; and acquiring the third reference image by smoothing the fifth reference image.

In some embodiments, adding the virtual item to the target region includes: acquiring a reference image, wherein pixel values of pixel points in the reference image are determined by classification identifiers; acquiring a first matrix, a second matrix, a third matrix and a fourth matrix, wherein elements of the first matrix are equal to pixel values of pixel points with same position in the target human face image; the second matrix has same size as the first matrix and all elements of the second matrix are equal to 1; elements of the third matrix are equal to pixel values of pixel points with same position in the reference image; elements of the fourth matrix are equal to pixel values of pixel points with same position in the virtual item; acquiring a fifth matrix based on the first matrix, the second matrix, the third matrix and the fourth matrix: $z=x*(a-mask)+y*mask$, wherein z is the fifth matrix, x is the first matrix, a is the second matrix, y is the third matrix, and mask is the fourth matrix; and generating, based on to the fifth matrix, a target human face image added with the virtual item, wherein pixel values of pixel points in each location of the target human face image is equal to elements in the same location of the fifth matrix.

Figure 2:
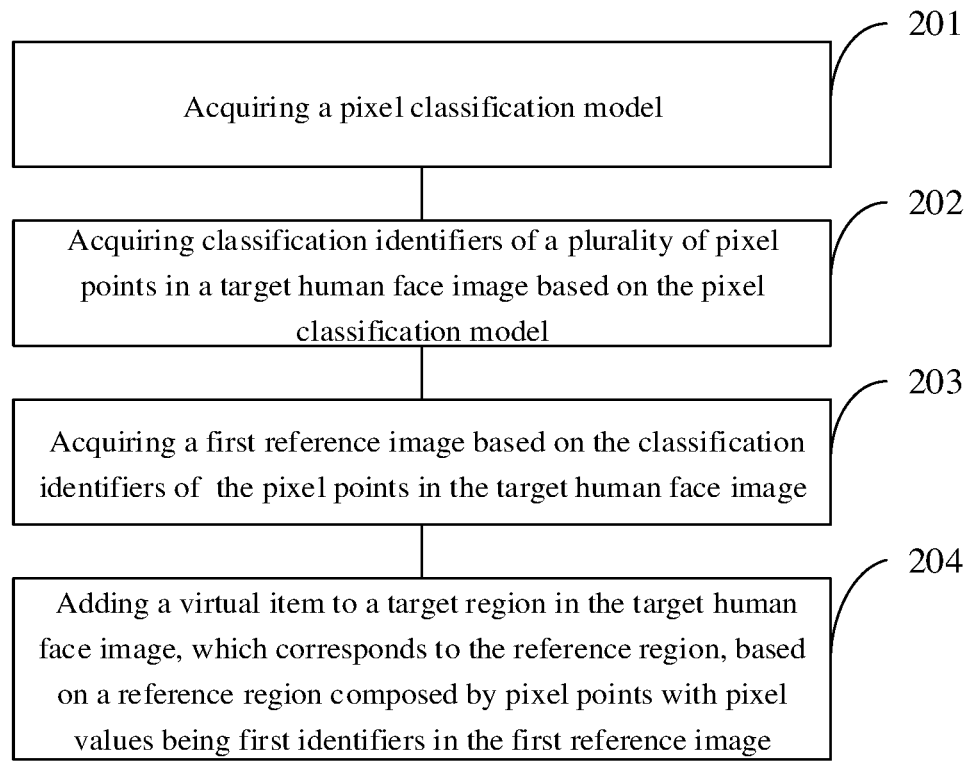
FIG. 2 is a flowchart showing another method for adding a virtual item according to an embodiment.

FIG. 2 is a flowchart showing a method for adding a virtual item according to an embodiment. As shown in FIG. 2, the method for adding the virtual item is applicable to a processor, which is exemplarily a unit having an image processing function, such as a mobile phone, a computer, a server and a camera. The method includes the following steps.

In 201, a pixel classification model is acquired.

The pixel classification model is configured to determine classification identifiers of pixel points in any image. By inputting any image into the pixel classification model, the classification identifiers of pixel points in the image may be determined, realizing classification of the pixel points in the image.

The classification identifier is a first identifier of pixel points in a first human face part or a second identifier of pixel points in a second human face part. The first human face part includes an uncovered human face part, and the second human face part includes a covered human face part or a non-human face part. The first identifier and the second identifier are two different identifiers. For example, the first identifier is 1, and the second identifier is 0; or the first identifier is 0, and the second identifier is 1.

During the training of the pixel classification model, a plurality of sample human face images and classification identifiers of pixel points in the plurality of sample human face images are acquired, and a trained pixel classification model is acquired by model training based on the plurality of sample human face images and the classification identifiers of pixel points in the plurality of sample human face images.

Each sample human face image includes one of the first human face part and the second human face part, and the classification identifiers of the pixel points belonging to the first human face part are the first identifier, and the classification identifiers of the pixel points belonging to the second human face part are the second identifier.

In some embodiments, in the process of training the pixel classification model, test classification identifiers of pixel points in any one of the plurality of sample human face images are acquired based on the pixel classification model, and an adjusted pixel classification model is acquired by adjusting model parameters of the pixel classification model based on the classification identifiers and the test classification identifiers of pixel points in the sample human face image.

During the training of the pixel classification model, in some embodiments, an initial pixel classification model is built first, and it is a pixel classification model that has been trained one or more times, or a pixel classification model that has not been trained. Then, based on a difference between the classification identifier and the test classification identifier of each pixel point in the sample human face image, an adjusted pixel classification model is acquired by adjusting model parameters of the pixel classification model.

For example, the pixel classification model is a neural network model including a multi-layer network. In some embodiments, after being input into the neutral network module, a feature of a human face image is acquired by processing the human face image using the multi-layer network in the neutral network model, and then predicted values of pixel points are calculated based on the feature of the human face image to further obtain the classification identifiers of the pixel points in the human face image. In some embodiments, a loss function adopted by the neural network model is softmax (a loss function), or other types of loss functions, which will not be limited in the embodiments of the present disclosure.

In some embodiments, a convolutional neural network model, a fully convolutional neural network model, a VGG16 (a neural network structure) model, an InceptionV1 (a neural network structure) model, and an InceptionV2 (a neural network structure) model, a resnet model, an Inception-resnet (a residual neural network structure) model, etc. are adopted for training the pixel classification model.

In some embodiments, the pixel classification model is trained and stored by the processor. In some embodiments, the pixel classification model is trained by a trainer, and the trained pixel classification model is transmitted to the processor for storage.

In some embodiments, in the subsequent process, a new sample human face image and classification identifiers of a plurality of pixel points in the sample human face image are acquired, and the pixel classification model is continuously trained, such that the pixel classification model classifies the first human face part and the second human face part in the human face image more accurately, and the accuracy of the pixel classification model is improved.

In 202, classification identifiers of a plurality of pixel points in a target human face image are acquired based on the pixel classification model.

In some embodiments, the target human face image is captured by the processor, or extracted from a video captured by the processor, or downloaded from the Internet by the processor, or transmitted to the processor by other devices. In some embodiments, when the processor performs video live streaming, each image in a video stream is acquired, and each picture is used as the target human face image so as to process each image in the video stream.

The target human face image includes a human face part and a non-human face part. The human face part includes a nose part, a mouth part, eye parts, and the like, and further includes an uncovered human face part and a covered human face part. The uncovered human face part is the first human face part, and the covered human face part and the non-human face part in the target human face image are the second human face parts.

For example, the human face parts in the target human face image are the nose part, the mouth part and the eye parts, the nose part or the mouth part is not covered, and the eye parts are covered. Therefore, the nose part and the mouth part are the first human face parts, and the eye parts and other parts in the target human face image than the nose part, the mouth part and the eye parts are the second human face parts.

The processor inputs the target human face image into the pixel classification model, processes the target human face image based on the pixel classification model, and classifies the pixel points in the target human face image based on the classification identifiers of the plurality of pixel points in the target human face image.

When the classification identifiers of pixel points in the target human face image are the first identifier, the pixel points belong to the first human face part. When the classification identifiers of pixel points in the target human face image are the second identifier, the pixel points belong to the second human face part. Therefore, the first human face part and the second human face part in the target human face image may be determined based on the obtained classification identifiers of pixel points in the target human face image.

In some embodiments, when the classification identifiers of the plurality of pixel points in the target human face image include the first identifiers, the target human face image includes the first human face part, and the following step 203 is executed.

It should be noted that this embodiment only takes that the target human face image includes the first human face part as an example for explanation. In another embodiment, when the classification identifiers of pixel points in the target human face image do not include the first identifier, the target human face image does not include the first human face part, and step 203 is not executed any more.

In 203, a first reference image is acquired based on the classification identifiers of pixel points in the target human face image.

The pixel values of pixel points in the first reference image are determined by the classification identifiers of pixel points in the target human face image. The first reference image is intended to indicate locations of the first human face part and the second human face part in the target human face image. Whether the pixel points in the target human face image belong to the first human face part or the second human face part may be determined by the first reference image.

In some embodiments, 203 includes any one of 2031 and 2032.

In 2031, the first reference image is acquired by using the classification identifiers of pixel points in the target human face image as pixel values of corresponding pixel points in a first reference image.

A location of the pixel point with the classification identifier being the first identifier in the first reference image is a location of the first human face part in the target human face image, and a location of the pixel point with the classification identifier being the second identifier in the first reference image is a location of the second human face part in the target human face image.

For example, if the first identifier is 1, the second identifier is 0, and the first reference image is a binarized image, in the binarized image, when the pixel values of pixel points are 1, pixel points in the target human face image, corresponding to the pixel points, belong to the first human face part, and when the pixel values of pixel points are 0, pixel points in the target human face image, corresponding to the pixel points, belong to the second human face part.

In 2032, the second reference image is acquired by taking the classification identifiers of pixel points in the target human face image as pixel values of corresponding pixel points in a second reference image, a first region including pixel points with the pixel values being the first identifier in the second reference image is determined from the second reference image, a second region including pixel points with the pixel values being the second identifier in the second reference image is determined from the second reference image, and a smoothed first reference image is acquired by smoothing a plurality of pixel points in the second reference image, including a plurality of pixel points adjacent to the second region in the first region and a plurality of pixel points adjacent to the first region in the second region.

Since the pixel points in the target human face image include pixel points belonging to the first human face part and pixel points belonging to the second human face part, and there is a boundary between the first human face part and the second human face part, i.e., there is a fault between the first human face part and the second human face part, there may be a fault between a virtual item added to the first human face part and the second human face part, which further results in poor transitivity of the virtual item.

Therefore, the second reference image may be determined based on the classification identifiers of pixel points in the target human face image, and a processed first reference image is acquired by smoothing the boundary between the first region and the second region in the second reference image. The subsequent step of adding the virtual item to the target human face image based on the first reference image is equivalent to the step of smoothing the first human face part and the second human face part in the target human face image to eliminate the fault between the first human face part and the second human face part and to smooth the virtual item.

The smoothing technology is feathering of the pixel points. In some embodiments, the pixel points are processed in a guided filtering manner, or the pixel points are processed in other ways.

In some embodiments, when a plurality of first pixel points in the first region, which are adjacent to the second region, are acquired from the second reference image, the plurality of pixel points in the first region, which are adjacent to the second region, are acquired, and then pixel points adjacent to the plurality of pixel points are acquired respectively and used as the first pixel points, i.e., multiple circles of pixel points in the first region are acquired as the first pixel points. When a plurality of second pixel points in the second region, which are adjacent to the first region, are acquired from the second reference image, the plurality of pixel points in the second region, which are adjacent to the first region, are acquired, then pixel points connected to the plurality of pixel points are acquired, and the acquired pixel points in the second region are used as the second pixel points, i.e., multiple circles of pixel points in the second region are acquired as the second pixel points. The second reference image is smoothed, i.e., a plurality of pixel points in the second reference image is smoothed. An image obtained by the smoothing is used as the first reference image, and the plurality of pixel points includes the first pixel points and the second pixel points.

In 204, a virtual item is added to a target region in the target human face image, which corresponds to the reference region, based on a reference region composed by pixel points with pixel values being first identifiers in the first reference image.

In some embodiments, the virtual item is virtual eye shadows, virtual lip gloss, virtual ear studs, or the like. The virtual item is a virtual item that matches the first human face part in the target human face image, or the virtual item is a virtual item selected by a user, or the virtual item is a virtual item acquired by other means.

The pixel values of the pixel points in the first reference image are the first identifier or the second identifier. When the pixel values of the pixel points are the first identifier, the pixel points belong to the first human face part, and when the pixel values of the pixel points are the second identifier, the pixel points belong to the second human face part.

Therefore, the region composed by the pixel points with the pixel values being the first identifiers in the first reference image is used as the reference region, and the target region in the target human face image, which belongs to the first human face part, may be determined based on the reference region in the first reference image. The virtual item may be added to the target region when added to the target human face image. That is, the reference region including the pixel points with the pixel values being the first identifiers in the first reference image is determined in the first reference image, the target region corresponding to the reference region is determined in the target human face image, and the virtual item is added to the target region of the target human face image.

It should be noted that each image is composed of a plurality of pixel points, and different images may be of the same or different sizes. For example, when the image is composed of 9 pixel points, the 9 pixel points are arranged in a 3*3 fashion, or when the image is composed of 12 pixel points, the 12 pixel points are arranged in a 3*4 fashion.

In addition, the pixel points in each image have pixel values, the pixel values of the plurality of pixel points in each image constitute a matrix, and all elements in the matrix are equal to the pixel values of the pixel points in the same location of the image. For example, when an image is composed of 9 pixel points, a matrix corresponding to the image is described as below:

$$\begin{bmatrix} 1 & 1 & 0 \\ 0 & 0 & 1 \\ 1 & 1 & 1 \end{bmatrix}$$

In some embodiments, since each image corresponds to one matrix, when a virtual makeup is added to the target human face image, the target human face image and the virtual makeup are respectively converted into corresponding matrices, and the target human face image added with the virtual item is generated by computing the matrices.

In some embodiments, a first matrix, a second matrix, a third matrix and a fourth matrix are acquired. All elements in each location of the first matrix are equal to the pixel values of the pixel points in the same location of the target human face image. The second matrix has same size as the first matrix, and all elements in each location of the second matrix are equal to 1. All elements in each location of the third matrix are equal to the pixel values of the pixel points in the same location of the first reference image. All elements in each location of the fourth matrix are equal to the pixel values of the pixel points in the same location of the virtual item.

A fifth matrix is acquired based on the first matrix, the second matrix, the third matrix and the fourth matrix by: z=x*(a−mask)+y*mask, wherein z is the fifth matrix, x is the first matrix, a is the second matrix, y is the third matrix, and mask is the fourth matrix.

A target human face image added with the virtual item is generated based on the fifth matrix, such that the pixel values of pixel points in the target human face image added with the virtual item are equal to the elements in the same location of the fifth matrix.

The target human face image and the virtual item are of the same size. When the pixel values of the pixel points in the first reference image are not 0, the pixel points belong to the first human face part, and when the pixel values of the pixel points are 0, the pixel points belong to the second human face part. A first region in the target human face image, which belongs to the second human face part, is acquired, then a second region in the virtual item, which belongs to the first human face part, is acquired, and a combined target human face image which is the target human face image added with the virtual item is acquired by combining the first region and the second region.

In this embodiment, the processor is equipped with a target application in which a virtual item is disposed. When using the target application, the user selects any image as the target human face image, and a terminal reads, by the target application, the target human face image to be added with the virtual item. The target human face image is displayed in a display interface of the target application. The user who expects to add the virtual item to the target human face image triggers a selection operation to any virtual item in the target application. At this time, steps 201 to 204 may be performed to add the virtual item selected by the user to the target human face image.

In some embodiments, the target application is a social application, a video interaction application, a picture beautification application, or the like. The trigger operation is a single-click operation, a double-click operation, a long-press operation, or the like.

It should be noted first that this embodiment only uses the pixel classification model for any human face part, and the uncovered human face part may be distinguished from the covered human face part or the non-human face part. In other embodiments, there may be many types of human face parts, the pixel classification model is used for a specific type of target human face part, and an uncovered target human face part may be distinguished from a covered target human face part or a non-target human face part in the target human face image.

In this case, the first human face part is the uncovered target human face part in the target human face image, and the second human face part is the covered target human face part and the non-target human face part in the human face image.

The target human face part includes a nose part, a mouth part, an eye part, and the like.

For example, the target human face part in the target face image is the mouth part, and the mouth part includes a covered part and an uncovered part. Therefore, the first human face part in the target human face image is the uncovered mouth part, and the second human face part is the covered mouth part and other parts in the target human face image than the mouth part.

Therefore, in this embodiment, when a virtual item is to be added to the specific type of target human face part, a pixel classification model for distinguishing the specific type of target human face part is determined and may be adopted to classify a plurality of pixel points in the target human face image so as to determine the classification identifiers of the pixel points belonging to the first human face part as the first identifier and the classification identifiers of the pixel points belonging to the second human face part as the second identifier. Subsequently, the virtual item may be added to the first human face part based on the determined classification identifiers of the pixel points.

It should be noted second that this embodiment only takes that the first identifier is not 0 and the second identifier is 0 as an example for explanation. In another embodiment, the first identifier is 1, the second identifier is 0, and the virtual item may be added to the target human face image by steps 201 to 204. In yet another embodiment, the first identifier and the second identifier have other values, and the method of adding a virtual item to the target human face image is similar to the above-mentioned steps, which are not described herein any further.

It should be noted third that this embodiment only takes that the first reference image of the target human face image is acquired, and the virtual item is added to the target human face image based on the first reference image as an example for explanation. In another embodiment, step 203 and step 204 are optional steps. After step 202 is performed, a region in the target human face image, which corresponds to the pixel points with the classification identifiers being the first identifier, is determined as a target region belonging to the first human face part. Then, a virtual item that matches the first human face part is added, based on the classification identifiers of the plurality of pixel points, to the target region in the target human face image, which belongs to the first human face part. When added to the target human face image, the virtual item is directly added to the first human face part indicated by the first identifier.

In the method according to the embodiments of the present disclosure, the pixel classification model configured to determine the classification identifiers of pixel points in any image is acquired, and the classification identifiers are the first identifier for indicating that corresponding pixel points belongs to the first human face part or the second identifier for indicating that corresponding pixel points belongs to the second human face part. The first human face part is an uncovered part, and the second human face part includes at least one of the covered human face part or the non-human face part. The classification identifiers of the plurality of pixel points in the target human face image are acquired based on the pixel classification model, and the virtual item that matches the human face part is added, based on the classification identifiers of the plurality of pixel points, to the target region in the target human face image, which belongs to the first human face part.

In addition, the second reference image is acquired based on the first identifier and the second identifier in the target human face image. The region in the second reference image, composed by the pixel points with the pixel values being the first identifiers, is determined as the first region. The region in the second reference image, composed by the pixel points with the pixel values being the second identifiers, is determined as the second region. The plurality of pixel points in the second reference image are smoothed, and an image obtained by the smoothing is used as the first reference image. The plurality of pixel points includes a plurality of first pixel points in the first region, which are adjacent to the second region, and a plurality of second pixel points in the second region, which are adjacent to the first region, so as to add the virtual item to the first human face part based on the first reference image. By smoothing the first pixel points and the second pixel points in the reference image, a processed first reference image is obtained, and a transition effect is exerted between the first pixel points and the second pixel points.

In the embodiment shown in FIG. 2, classification identifiers of a target human face image are acquired based on a pixel classification model, and a virtual item is added to the target human face image based on the classification identifiers. In the embodiment shown in FIG. 3, key pixel points in a target human face image, which belong to a human face part, are detected using a key point detection algorithm, then a human face region is determined based on the key pixel points, after that, classification identifiers of the human face region are acquired based on a pixel classification model, and a virtual item is added to the target human face image based on the determined classifying identifier.

Figure 3:
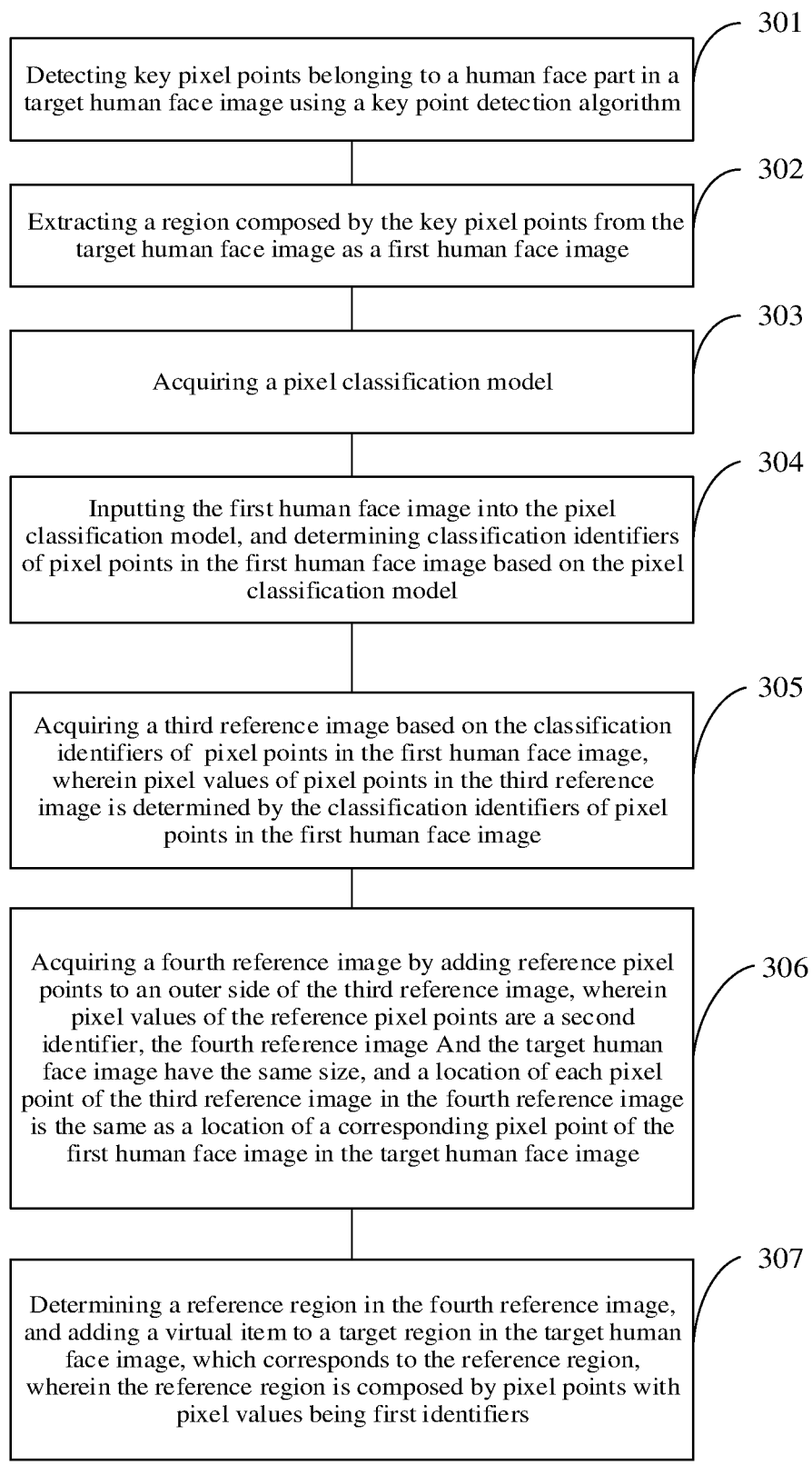
FIG. 3 is a flowchart showing still another a method for adding a virtual item according to an embodiment.

FIG. 3 is a flowchart showing a method for adding a virtual item according to an embodiment. As shown in FIG. 3, the method is applicable to a processor. In some embodiments, the processor is a unit having the function of adding a virtual item, such as a mobile phone, a computer, a server and a camera. The method includes the following steps.

In 301, key pixel points belonging to a human face part are detected in a target human face image using a key point detection algorithm.

The key point detection algorithm is used for determining the key pixel points in any human face image. When the key point detection algorithm may only detect the key pixel points belonging to one human face part, the detected key pixel points are key pixel points of the human face part, such as mouth key pixel points or nose key pixel points or facial contour key pixel points. When the key point detection algorithm may detect the key pixel points belonging to a plurality of human face parts, the detected key pixel points are key pixel points of the plurality of human face parts, such as mouth key pixel points, nose key pixel points, and facial contour key pixel points.

The plurality of key pixel points in the target human face image, which belong to the human face part, may be detected using the key point detection algorithm, and subsequently, the human face part to which the plurality of key pixel points belong may be determined based on the plurality of key pixel points.

In some embodiments, the key point detection algorithm is adopted to detect a plurality of contour key pixel points in the target human face image, which belong to the human face part, the plurality of contour key pixel points are subsequently connected to obtain a connected connecting line, and a region located within the connecting line is a region belonging to the human face part. In some embodiments, the key point detection algorithm is adopted to detect key pixel points in the target human face image, which belong to a region of the human face part, edge pixel points are subsequently acquired from the plurality of key pixel points and connected to obtain a connected connecting line, and a region located within the connecting line is a region belonging to the human face part.

In some embodiments, the key point detection algorithm is a key point detection model, and the key pixel points in the target human face image are acquired by detecting key pixel points of the target human face image based on the key point detection model.

In some embodiments, during the training of the key point detection model, a plurality of sample human face images and key pixel points in the plurality of sample human face images are acquired first, and the key point detection model is acquired by performing model training based on the plurality of sample human face images and the key pixel points in the plurality of sample human face images.

In some embodiments, during the training of the key point detection model, an initial key point detection model is built, and a training data set and a test data set are acquired. Both of the training data set and the test data set include a plurality of sample human face images and key pixel points in the sample human face images.

In the process of training the key point detection model, a plurality of sample human face images in the training data set are used as inputs of the key point detection model, and key pixel points in the plurality of sample human face images are used as outputs of the key point detection model. The key point detection model is trained to make the key point detection model learn the key pixel points, such that the key point detection model has the ability to detect the key pixel points. After that, each sample human face image in the test data set is input into the key point detection model, and test key pixel points in each sample human face image are determined based on the key point detection model. The test key pixel points and label key pixel points are compared, and an adjusted key point detection model is acquired by adjusting the key point detection model based on a comparison result.

In some embodiments, the key point detection model is trained and stored by the processor. In some embodiments, the key point detection model is trained by a trainer, and the trained key point detection model is transmitted to the processor for storage.

In some embodiments, in the subsequent process, a new sample human face image and key pixel points in the sample human face image are acquired, and a trained key point detection model is acquired by continuously training the key point detection model, such that the key point detection model may detect the key pixel points more accurately.

In 302, a region composed by the key pixel points is extracted from the target human face image as a first human face image.

When key pixel points of a plurality of human face parts are determined using the key point detection algorithm, the plurality of human face parts may be determined based on the determined key pixel points. For example, the plurality of human face parts are a mouth region, a nose region, etc. In some embodiments, when key pixel points of the target human face part are determined using the key point detection algorithm, the target human face part may be determined based on the determined key pixel points. For example, the target human face part is the mouth region, the nose region or the like.

In some embodiments, when the determined plurality of key pixel points are contour key pixel points of the human face part, the plurality of contour key pixel points are connected to form an interconnected connecting line, and a region located within the connecting line is used as the first human face image. In some embodiments, when the determined plurality of key pixel points are key pixel points located within a region belonging to the human face part, edge pixel points of the plurality of key pixel points are acquired and connected to obtain a connected connecting line, and a region located within the connecting line is used as the first human face image.

In 303, a pixel classification model is acquired.

In 304, the first human face image is input into the pixel classification model, and classification identifiers of pixel points in the first human face image are determined based on the pixel classification model.

Steps 303 to 304 are similar to step 201 to step 202 in the above embodiment, which are not described herein any further. Their difference lies in that in step 201 and step 202, the sample human face image used during the training of the pixel classification model in steps 201 and 202 includes the human face part, and the sample human face image used during the training of the pixel classification model in steps 303 and 304 is only an image of the human face part.

In 305, a third reference image is acquired based on the classification identifiers of pixel points in the first human face image. Pixel values of pixel points in the third reference image are determined by the classification identifiers of pixel points in the first human face image.

The third reference image is intended to indicate locations of the first human face part and the second human face part in the first human face image, and whether the pixel points in the first human face image belong to the first human face part or the second human face part may be determined based on the third reference image.

Step 305 includes any one of steps 3051 and 3052.

In 3051, a third reference image is acquired by taking the classification identifiers of pixel points in the first human face image as the pixel values of corresponding pixel points in the third reference image.

For example, if the first identifier is 1, the second identifier is 0, and the third reference image is a binarized image, in the binarized image, when the pixel values of pixel points are 1, pixel points in the first human face image, corresponding to the pixel points, belong to the first human face part, and when the pixel values of pixel points are 0, pixel points in the first human face image, corresponding to the pixel points, belongs to the second human face part.

In 3052, a fifth reference image is acquired by taking the classification identifiers of pixel points in the first human face image as the pixel values of corresponding pixel points in the fifth reference image, a third region including pixel points with the pixel values being the first identifier in the fifth reference image is determined from the fifth reference image, a fourth region including pixel points with the pixel values being the second identifier in the fifth reference image is determined from the fifth reference image, and the third reference image is acquired by smoothing a plurality of pixel points in the fifth reference image, including a plurality of third pixel points in the third region, which are adjacent to the fourth region, and a plurality of fourth pixel points in the fourth region, which are adjacent to the third region.

Since the pixel points in the first human face image include pixel points belonging to the first human face part and pixel points belonging to the second human face part, and there is a boundary between the first human face part and the second human face part, i.e., there is a fault between the first human face part and the second human face part, there may be a fault between a virtual item added to the first human face part and the second human face part, which further results in poor transitivity of the virtual item.

Therefore, the fifth reference image may be determined based on the classification identifiers of pixel points in the first human face image, and a processed third reference image is acquired by smoothing the pixel points in the fifth reference image, which are adjacent to pixel points for indicating the first human face part, and the pixel points in the fifth reference image, which are adjacent to pixel points for indicating the second human face part. At this time, the first human face part and the second human face part in the first human face image are smoothed, the fault between the first human face part and the second human face part is eliminated, and the virtual item is also smoothed while being added to the first human face part.

The smoothing technology is feathering of the pixel points. In some embodiments, the pixel points are processed in a guided filtering manner, or the pixel points are processed in other ways.

In some embodiments, when a plurality of third pixel points in the third region, which are adjacent to the fourth region, are acquired from the fifth reference image, a plurality of pixel points in the third region, which are adjacent to the fourth region, are acquired, and then pixel points adjacent to the plurality of pixel points are acquired and used as third pixel points, i.e., multiple circles of pixel points in the third region are acquired as the third pixel points. When a plurality of fourth pixel points in the fourth region, which are adjacent to the third region, are acquired from the fifth reference image, the plurality of pixel points in the fourth region, which are adjacent to the third region, are acquired, then pixel points connected to the plurality of pixel points are acquired, and the acquired pixel points in the fourth region are used as fourth pixel points, i.e., multiple circles of pixel points in the fourth region are acquired as the fourth pixel points. Thus, the plurality of pixel points in the fifth reference image are smoothed, an image obtained by the smoothing is used as the third reference image, and the plurality of pixel points includes the third pixel points and the fourth pixel points.

In 306, a fourth reference image is acquired by adding reference pixel points to an outer side of the third reference image, wherein pixel values of the reference pixel points are a second identifier, the fourth reference image and the target human face image are of the same size, and a location of each pixel point of the third reference image in the fourth reference image is the same as a location of a corresponding pixel point of the first human face image in the target human face image.

The pixel values of the pixel points in the third reference image are the first identifier or the second identifier. When the pixel values of the pixel points are the first identifier, the pixel points belong to the first human face part, and when the pixel values of the pixel points are the second identifier, the pixel points belong to the second human face part.

Since the first human face image which is an image extracted from the target human face image includes the human face part, the first human face part in the first human face image may be determined based on the determined first identifier after the first human face images are classified. However, since other regions in the target human face image than the first human face image belong to the second human face part, the fourth reference image corresponding to the target human face image may be determined by adding the reference pixel points to the outer side of the third reference image. The fourth reference image is configured to indicate the pixel points in the target human face image, which belong to the first human face part and the second human face part.

In 307, a reference region is determined in the fourth reference image and a virtual item is added to a target region in the target human face image, which corresponds to the reference region.

The reference region includes pixel points with pixel values being the first identifiers, in the fourth reference image. In some embodiments, the virtual item is virtual eye shadows, virtual lip gloss, virtual ear studs, etc. The virtual item is an item that matches the first human face part in the target human face image, or the virtual item is an item selected by a user, or the virtual item is an item acquired by other means.

Therefore, the region composed by the pixel points with the pixel values being the first identifiers in the first reference image is used as the reference region. When the virtual item is added to the target human face image, the target region in the target human face image, which belongs to the first human face part, may be determined based on the reference region in the first reference image. When being added to the target human face image, the virtual item may be added to the target region.

In some embodiments, a first matrix, a second matrix, a third matrix and a fourth matrix are acquired. All elements in each location of the first matrix are equal to the pixel values of the pixel points in the same location of the target human face image. The second matrix and the first matrix are of the same size, and all elements in each location of the second matrix are equal to 1. All elements in each location of the third matrix are equal to the pixel values of the pixel points in the same location of the fourth reference image. All elements in each location of the fourth matrix are equal to the pixel values of the pixel points in the same location of the virtual item.

A fifth matrix is acquired based on the first matrix, the second matrix, the third matrix and the fourth matrix using:

$z=x*(a-mask)+y*mask$, wherein z is the fifth matrix, x is the first matrix, a is the second matrix, y is the third matrix, and mask is the fourth matrix.

The target human face image added with the virtual item is generated based on the fifth matrix, such that the pixel values of pixel points in the target human face image added with the virtual item are equal to the elements in the same location of the fifth matrix.

The target human face image and the virtual item are of the same size. When the pixel values of the pixel points in the fourth reference image is 1, the pixel points belong to the first human face part, and when the pixel values of the pixel points are 0, the pixel points belong to the second human face part. A first region in the target human face image, which belongs to the second human face part, is acquired, then a second region in the virtual item, which belongs to the first human face part, is acquired, and a combined target human face image which is an image added with the virtual item is acquired by combining the first region and the second region.

In some embodiments, the target human face image and the virtual item may be of different sizes. At this time, the size of the virtual item is adjusted according to the size of the target human face image, such that the virtual item and the target human face image are of the same size. The virtual item may be subsequently added to the target human face image.

It should be noted first that this embodiment only takes that the first identifier is not 0 and the second identifier is 0 as an example for explanation. In another embodiment, the first identifier is 1, the second identifier is 0, and the virtual item may be added to the target human face image by steps 301 to 307. In yet another embodiment, the first identifier and the second identifier have other values, and the way in which the virtual item is added to the target human face image is similar to the foregoing steps, which is not described herein any further.

It should be noted second that this embodiment only takes that the third reference image of the first human face image is generated, and the virtual item is added to the target human face image based on the third reference image as an example for explanation. In another embodiment, steps 305 to 307 are optional steps. After step 304 is performed, a region in the target human face image, where the pixel points with the pixel values being the first identifier in the first human face image are located, is acquired as a target region belonging to the first human face part. Then, a virtual item is directly added to the target region.

It should be noted third that this embodiment only takes that the virtual item is added to the target human face image by the fourth reference image as an example for explanation. In another embodiment, when a virtual item is added to the target human face image, the first human face image added with the virtual item is acquired by processing the first human face image based on the third reference image using the following formula.

The first matrix, the second matrix, the third matrix and the fourth matrix are acquired. All elements in each location of the first matrix are equal to the pixel values of the pixel points in the same location of the target human face image. The second matrix and the first matrix are of the same size, and all elements in each location of the second matrix are equal to 1. All elements in each location of the third matrix are equal to the pixel values of the pixel points in the same location of the third reference image. All elements in each location of the fourth matrix are equal to the pixel values of the pixel points in the same location of the virtual item.

A fifth matrix is acquired based on the first matrix, the second matrix, the third matrix and the fourth matrix using: $z=x*(a-mask)+y*mask$, wherein z is the fifth matrix, x is the first matrix, a is the second matrix, y is the third matrix, and mask is the fourth matrix.

The target human face image added with the virtual item is generated based on the fifth matrix, such that the pixel values of pixel points in the target human face image added with the virtual item are equal to the elements in the same location of the fifth matrix.

The first human face image and the virtual item are of the same size. When the pixel values of the pixel points in the third reference image are 1, the pixel points belong to the first human face part, and when the pixel values of the pixel points are 0, the pixel points belong to the second human face part. A first region in the first human face image, which belongs to the second human face part, is acquired, then a second region in the virtual item, which belongs to the first human face part, is acquired, and a combined target human face image which is the first human face image added with the virtual item is acquired by combining the first region and the second region. Since the first human face image added with the virtual item and the first human face image not added with the virtual item are of the same size, the first human face image added with the virtual item may be directly added to the target human face image to generate a processed target human face image which is a human face image added with the virtual item.

In some embodiments, when the virtual item and the first human face image are of different sizes, the size of the virtual item is adjusted according to the size of the first human face image, such that the virtual item and the first human face image are of the same size.

In some other embodiments, when the virtual item and the first human face image are of different sizes, the size of the virtual item is adjusted based on the determined key pixel points of the first human face image, such that the virtual item and the first human face image are of the same size.

In the method according to the embodiments of the present disclosure, the plurality of key pixel points belonging to the human face part are detected in the target human face image using a key point detection algorithm. A region composed of the plurality of key pixel points is extracted from the target human face image as the first human face image. The first human face image is input into the pixel classification model. The classification identifiers of pixel points in the first human face image are determined based on the pixel classification model. The fourth reference image of the target human face image is determined based on the classification identifiers of pixel points in the first human face image. The reference region is determined based on the pixel points with the pixel values being the first identifier in the fourth reference image. The virtual item is added to the target region in the target human face image, which corresponds to the reference region.

In addition, the fifth reference image is generated based on the first identifier and the second identifier in the first human face image. The region in the fifth reference image, composed by the pixel points with the pixel values being the first identifiers, is determined as the third region. The region in the fifth reference image, composed by the pixel points with the pixel values being the second identifiers, is determined as the fourth region. An image is acquired by smoothing the plurality of pixel points in the fifth reference image, and the image is used as the third reference image. The plurality of pixel points include a plurality of third pixel points in the third region, which are adjacent to the fourth region, and a plurality of fourth pixel points in the fourth region, which are adjacent to the third region. The fourth reference image is acquired by adding pixel points with the pixel values being the second identifier to the outer side of the third reference image, such that the virtual item is added to the first human face part based on the fourth reference image. By smoothing the third pixel points and the fourth pixel points in the third reference image, a processed fourth reference image is obtained, and a transition effect is exerted between the third pixel points and the fourth pixel points.

Figure 4:
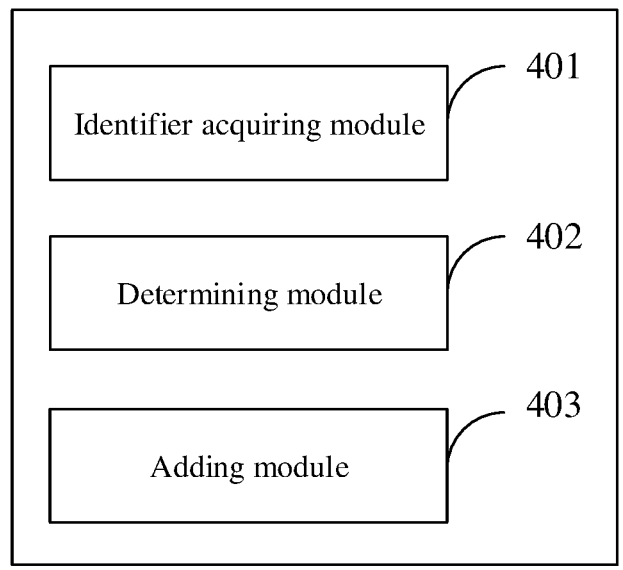
FIG. 4 is a schematic structural diagram of an apparatus for adding a virtual item according to an embodiment.

FIG. 4 is a schematic structural diagram of a system for adding a virtual item according to an embodiment. Referring to FIG. 4, the system includes:

an identifier acquiring module 401, configured to acquire classification identifiers of a plurality of pixel points in a target human face image, wherein the classification identifier includes a first identifier of pixel points in a first human face part or a second identifier of pixel points in a second human face part;

a determining module 402, configured to determine a target region in the target human face image based on the classification identifiers, wherein the target region is a region belonging to the first human face part; and an adding module 403, configured to add a virtual item to the target region;

wherein the first human face part includes an uncovered human face part, and the second human face part includes a covered human face part or a non-human face part.

The system according to this embodiment acquires the classification identifiers of the plurality of pixel points in the target human face image, and adds, based on the classification identifiers of the plurality of pixel points, the virtual item that matches the human face part to the target region in the target human face image, which belongs to the first human face part. When a region of the human face part is covered, the classification identifier of the covered region of the human face part should be the second identifier, such that the virtual item is not added to the covered face part after the region of the human face part is covered, and instead, the virtual item may only be added to a region corresponding to pixel points indicated by the first identifier.

Figure 5:
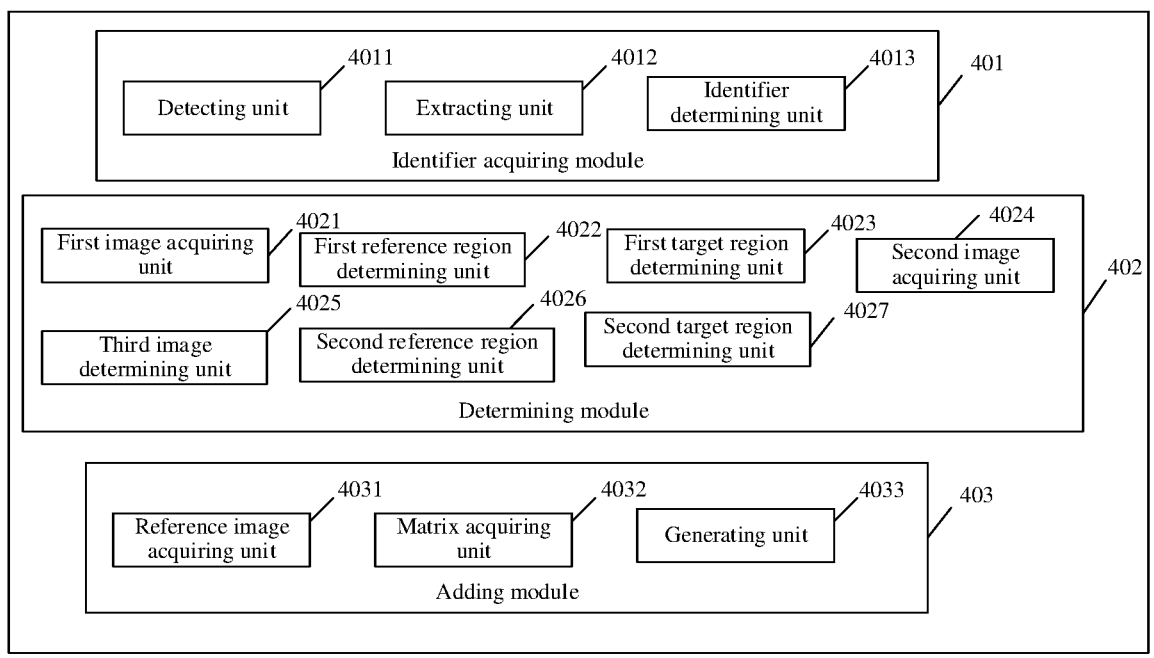
FIG. 5 is a schematic structural diagram of another apparatus for adding a virtual item according to an embodiment.

In some embodiments, referring to FIG. 5, the identifier acquiring module 401 is configured to: acquire features of the target human face image by extracting the feature from the target human face image based on a pixel classification model; and determine the classification identifiers of pixel points in the target human face image based on the features of the target human face image.

In some other embodiments, referring to FIG. 5, the determining module 402 includes:

a first image acquiring unit 4021, configured to acquire a first reference image based on the classification identifiers, wherein pixel values of pixel points in the first reference image are determined by the classification identifiers;

a first reference region determining unit 4022, configured to determine a reference region in the first reference image, wherein the reference region includes pixel points with the first identifier; and a first target region determining unit 4023, configured to determine the target region according to the reference region in the target human face image.

In some other embodiments, the first image acquiring unit 4021 is further configured to: determine a second reference image, wherein pixel values of pixel points in the second reference image are classification identifiers; and acquire the first reference image by smoothing the second reference image.

In some other embodiments, referring to FIG. 5, the identifier acquiring module 401 includes:

a detecting unit 4011, configured to detect key pixel points belonging to a human face part in the target human face image;

an extracting unit 4012, configured to determine a first human face image, wherein the first human face image includes a region composed by key pixel points; and an identifier determining unit 4013, configured to determine classification identifiers of pixel points in the first human face image.

In some embodiments, referring to FIG. 5, the extracting unit 4012 is configured to:

acquire edge pixel points of key pixel points in response to the key pixel points being located within a region of a human face part, wherein the edge pixel points are located on a contour of the human face part; and determine the first human face image including the region connected by the edge pixel points.

In some other embodiments, referring to FIG. 5, the determining module 402 includes:

a second image acquiring unit 4024, configured to acquire a third reference image based on classification identifiers of pixel points in the first human face image, wherein pixel values of pixel points in the third reference image are determined based on the classification identifiers of pixel points in the first human face image;

a third image determining unit 4025, configured to acquire a fourth reference image by adding reference pixel points to outer side of the third reference image, wherein pixel values of the reference pixel points are the second identifier, the fourth reference image and the target human face image have the same size, and a location of each pixel point of the third reference image in the fourth reference image is the same as a location of a corresponding pixel point of the first human face image in the target human face image; and a second reference region determining unit 4026, configure to determine a reference region in the fourth reference image; and a second target region determining unit 4027, configured to determine, in the target human face image, a target region corresponding to the reference region, wherein the reference region includes pixel points with pixel values being the first identifier in the fourth reference image.

In some other embodiments, the second image acquiring unit 4024 is further configured to: determine a fifth reference image, wherein pixel values of pixel points in the fifth reference image are classification identifiers; and acquire the third reference image by smoothing the fifth reference image.

In some other embodiments, referring to FIG. 5, the adding module 403 includes:

a reference image acquiring unit 4031, configured to acquire a reference image, wherein pixel values of pixel points in the reference image are determined by classification identifiers;

a matrix acquiring unit 4032, configured to acquire a first matrix, a second matrix, a third matrix and a fourth matrix, wherein elements of the first matrix are equal to pixel values of pixel points with same position in the target human face image; the second matrix has same size as the first matrix and all elements of the second matrix are equal to 1; elements of the third matrix are equal to pixel values of pixel points with same position in the reference image; elements of the fourth matrix are equal to pixel values of pixel points with same position in the virtual item;

The matrix acquiring unit 4032 is further configured to acquire a fifth matrix based on the first matrix, the second matrix, the third matrix and the fourth matrix: $z=x*(a-mask)+y*mask$, wherein z is the fifth matrix, x is the first matrix, a is the second matrix, y is the third matrix, and mask is the fourth matrix.

The adding module 403 further includes a generating unit 4033, configured to generate, based on the fifth matrix, a target human face image added with the virtual item, wherein pixel values of pixel points in each location of the target human face image is equal to elements in the same location of the fifth matrix.

With regard to the apparatus in the above embodiment, operations and functions implemented by the respective modules are described in detail in the embodiment relating to the method, which are not described herein any further.

Figure 6:
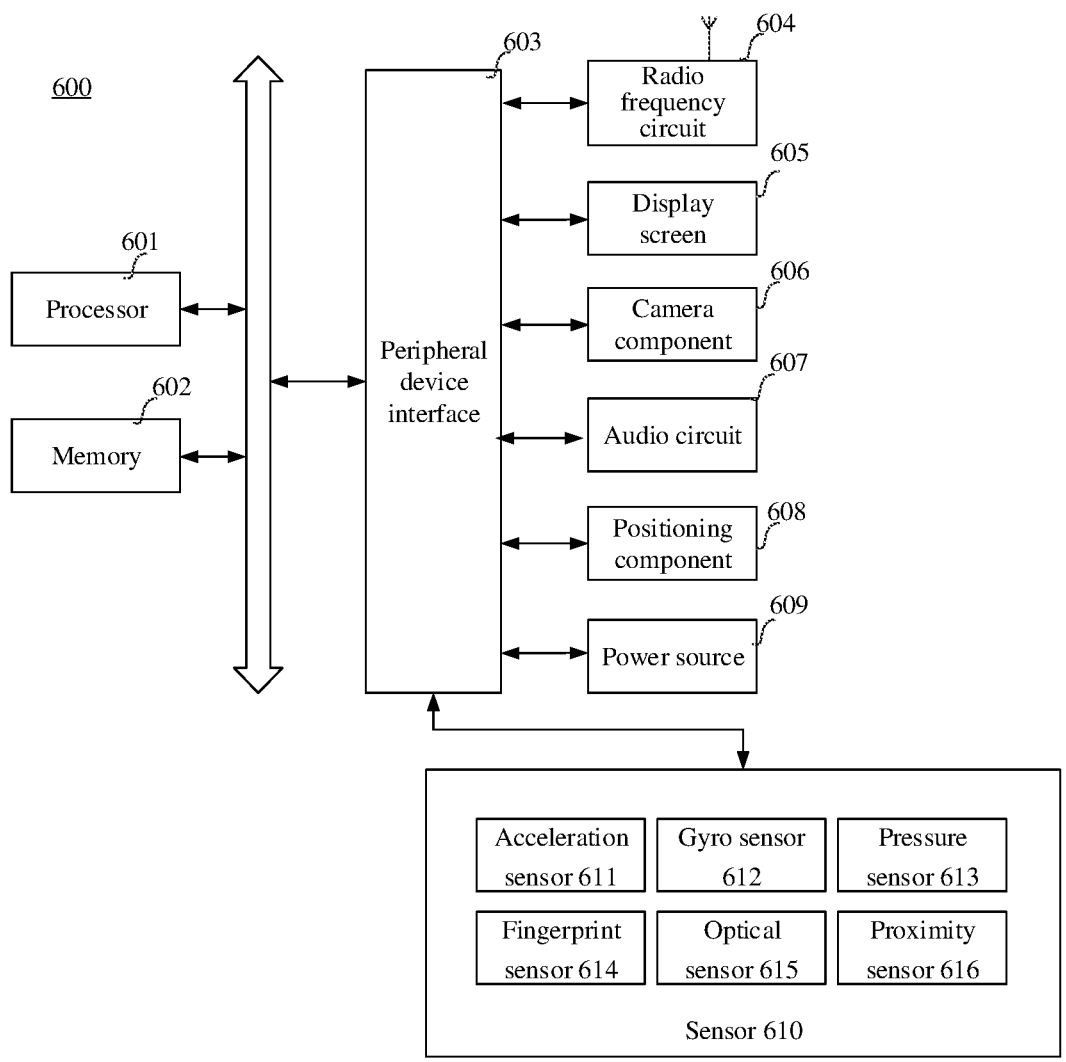
FIG. 6 is a block diagram of a terminal according to an embodiment.

FIG. 6 is a block diagram of a terminal according to an embodiment. In some embodiments, the terminal 600 may be such a portable mobile terminal as a smart phone, a tablet PC, a Moving Picture Experts Group Audio Layer III (MP3) player, a Moving Picture Experts Group Audio Layer IV (MP4) player, a laptop or a desk computer. The terminal 600 may also be called a user equipment (UE), a portable terminal, a laptop terminal, a desk terminal, or the like.

Generally, the terminal 600 includes at least one processor 601 and at least one memory 602.

In some embodiments, the processor 601 may include at least one processing cores, such as a 4-core processor and an 8-core processor. In some embodiments, the processor 601 may be formed by at least one hardware of a digital signal processor (DSP), a field-programmable gate array (FPGA), and a programmable logic array (PLA). In some embodiments, the processor 601 may also include a main processor and a coprocessor. The main processor is a processor for processing the data in an awake state, and is also called a central processing unit (CPU). The coprocessor is a low-power-consumption processor for processing the data in a standby state. In some embodiments, the processor 601 may be integrated with a graphics processing unit (GPU), which is configured to render and draw the content that needs to be displayed by a display screen. In some embodiments, the processor 601 may also include an Artificial Intelligence (AI) processor configured to process computational operations related to machine learning.

In some embodiments, the memory 602 may include at least one computer-readable storage medium, which can be non-transitory. The memory 602 may also include a volatile memory or a non-volatile memory, such as at least one disk storage device and flash storage device. In some embodiments, the non-transitory computer-readable storage medium in the memory 602 is configured to store at least one instruction. The at least one instruction is intended to be executed by the processor 601 to implement the methods for adding the virtual item, according to the method embodiments of the present disclosure.

In some embodiments, the terminal 600 also optionally includes a peripheral device interface 603 and at least one peripheral device. The processor 601, the memory 602, and the peripheral device interface 603 may be connected by a bus or a signal line. In some embodiments, each peripheral device may be connected to the peripheral device interface 603 by a bus, a signal line or a circuit board. In particular, the peripheral device includes at least one of a radio frequency circuit 604, a touch display screen 605, a camera component 606, an audio circuit 607, a positioning component 608 or a power source 609.

The peripheral device interface 603 may be configured to connect at least one peripheral device associated with an input/output (I/O) to the processor 601 and the memory 602. In some embodiments, the processor 601, the memory 602 and the peripheral device interface 603 are integrated on the same chip or circuit board. In some other embodiments, any one or two of the processor 601, the memory 602 and the peripheral device interface 603 may be implemented on a separate chip or circuit board, which is not limited in this embodiment.

The radio frequency circuit 604 is configured to receive and transmit a radio frequency (RF) signal, which is also referred to as an electromagnetic signal. The radio frequency circuit 604 communicates with a communication network and other communication devices via the electromagnetic signal. The radio frequency circuit 604 converts the electrical signal into the electromagnetic signal for transmission, or converts the received electromagnetic signal into the electrical signal. In some embodiments, the radio frequency circuit 604 includes an antenna system, an RF transceiver, at least one amplifier, a tuner, an oscillator, a digital signal processor, a codec chipset, a subscriber identity module card, and the like. In some embodiments, the radio frequency circuit 604 can communicate with other terminals via at least one wireless communication protocol. The wireless communication protocol includes, but not limited to, a metropolitan area network, various generations of mobile communication networks (2G, 3G, 4G, and 5G), a wireless local area network, and/or a wireless fidelity (Wi-Fi) network. In some embodiments, the radio frequency circuit 604 may also include near-field communication (NFC) related circuits, which is not limited in the present disclosure.

The display screen 605 is configured to display a user interface (UI). The UI may include graphics, text, icons, videos, and any combination thereof. When being a touch display screen, the display screen 605 also has the capacity to acquire touch signals on or over the surface of the display screen 605. The touch signal may be input into the processor 601 as a control signal for processing. At this time, the display screen 605 may also be configured to provide virtual buttons and/or virtual keyboards, which are also referred to as soft buttons and/or soft keyboards. In some embodiments, one display screen 605 may be disposed on the front panel of the terminal 600. In some other embodiments, at least two display screens 605 may be disposed respectively on different surfaces of the terminal 600 or in a folded design. In further embodiments, the display screen 605 may be a flexible display screen disposed on the curved or folded surface of the terminal 600. Even the display screen 605 may have an irregular shape other than a rectangle, i.e., the display screen 605 may be an irregular-shaped screen. The display screen 605 may be a liquid crystal display (LCD) screen, an organic light-emitting diode (OLED) screen, or the like.

The camera component 606 is configured to capture images or videos. In some embodiments, the camera component 606 includes a front camera and a rear camera. Usually, the front camera is placed on the front panel of the virtual reality display device, and the rear camera is placed on the back of the virtual reality display device. In some embodiments, at least two rear cameras are disposed, and are at least one of a main camera, a depth-of-field camera, a wide-angle camera, or a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 606 may also include a flashlight. The flashlight may be a mono-color temperature flashlight or a two-color temperature flashlight. The two-color temperature flash is a combination of a warm flashlight and a cold flashlight and can be used for light compensation at different color temperatures.

In some embodiments, the audio circuit 607 may include a microphone and a speaker. The microphone is configured to collect sound waves of users and environments, and convert the sound waves into electrical signals which are input into the processor 601 for processing, or input into the RF circuit 604 for voice communication. In some embodiments, for the purpose of stereo acquisition or noise reduction, there may be a plurality of microphones respectively disposed at different locations of the terminal 600. In some embodiments, the microphone may also be an array microphone or an omnidirectional acquisition microphone. The speaker is then configured to convert the electrical signals from the processor 601 or the radio frequency circuit 604 into the sound waves. In some embodiments, the speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 607 may also include a headphone jack.

The positioning component 608 is configured to locate the current geographic location of the terminal 600 to implement navigation or a location based service (LBS). In some embodiments, the positioning component 608 may be the global positioning system (GPS) from the United States, the Beidou positioning system from China, the Grenas satellite positioning system from Russia or the Galileo satellite navigation system from the European Union.

The power source 609 is configured to power up various components in the terminal 600. In some embodiments, the power source 609 may be alternating current, direct current, a disposable battery, or a rechargeable battery. When the power source 609 includes the rechargeable battery, the rechargeable battery may a wired rechargeable battery or a wireless rechargeable battery. The rechargeable battery may also support the fast charging technology.

In some embodiments, terminal 600 also includes at least one sensor 610. The at least one sensor 610 includes, but not limited to, an acceleration sensor 611, a gyro sensor 612, a pressure sensor 613, a fingerprint sensor 614, an optical sensor 615 and a proximity sensor 616.

In some embodiments, the acceleration sensor 611 is capable of detecting magnitudes of accelerations on three coordinate axes of a coordinate system established by the terminal 600. For example, the acceleration sensor 611 is configured to detect components of a gravitational acceleration on the three coordinate axes. In some embodiments, the processor 601 may control the touch display screen 605 to display a user interface in a landscape view or a portrait view according to a gravity acceleration signal collected by the acceleration sensor 611. In some embodiments, the acceleration sensor 611 may also be configured to collect motion data of a game or a user.

In some embodiments, the gyro sensor 612 is capable of detecting a body direction and a rotation angle of the terminal 600, and can cooperate with the acceleration sensor 611 to collect a 3D motion of the user on the terminal 600. Based on the data collected by the gyro sensor 612, the processor 601 is capable of implementing the following functions: motion sensing (such as changing the UI according to a user's tilt operation), image stabilization during shooting, game control and inertial navigation.

In some embodiments, the pressure sensor 613 may be disposed on a side frame of the terminal 600 and/or a lower layer of the touch display screen 605. When the pressure sensor 613 is disposed on the side frame of the terminal 600, a user's holding signal to the terminal 600 can be detected. The processor 601 is capable of performing left-right hand recognition or quick operation according to the holding signal collected by the pressure sensor 613. When the pressure sensor 613 is disposed on the lower layer of the touch display screen 605, the processor 601 controls an operable control on the UI according to a user's pressure operation on the touch display screen 605. The operable control includes at least one of a button control, a scroll bar control, an icon control or a menu control.

The fingerprint sensor 614 is configured to collect a user's fingerprint. The processor 601 identifies the user's identity based on the fingerprint collected by the fingerprint sensor 614, or the fingerprint sensor 614 identifies the user's identity based on the collected fingerprint. When the user's identity is identified as trusted, the processor 601 authorizes the user to perform related sensitive operations, such as unlocking the screen, viewing encrypted information, downloading software, paying, and changing settings. In some embodiments, the fingerprint sensor 614 may be provided on the front, back, or side of the terminal 600. When the terminal 600 is provided with a physical button or a manufacturer's Logo, the fingerprint sensor 614 may be integrated with the physical button or the manufacturer's Logo.

The optical sensor 615 is configured to collect ambient light intensity. In one embodiment, the processor 601 may control the display brightness of the touch display screen 605 according to the ambient light intensity collected by the optical sensor 615. In particular, when the ambient light intensity is high, the display brightness of the touch display screen 605 is increased; and when the ambient light intensity is low, the display brightness of the touch display screen 605 is decreased. In another embodiment, the processor 601 may also dynamically adjust shooting parameters of the camera component 606 according to the ambient light intensity collected by the optical sensor 615.

The proximity sensor 616, also referred to as a distance sensor, is usually disposed on the front panel of the terminal 600. The proximity sensor 616 is configured to capture a distance between the user and a front surface of the terminal 600. In one embodiment, when the proximity sensor 616 detects that the distance between the user and the front surface of the terminal 600 becomes gradually smaller, the processor 601 controls the touch display screen 605 to switch from a screen-on state to a screen-off state. When it is detected that the distance between the user and the front surface of the terminal 600 gradually increases, the processor 601 controls the touch display screen 605 to switch from the screen-off state to the screen-on state.

It will be understood by those skilled in the art that the structure shown in FIG. 6 does not constitute a limitation to the terminal 600, and in some embodiments, may include more or less components than those illustrated, or combine some components or adopt different component arrangements.

Figure 7:
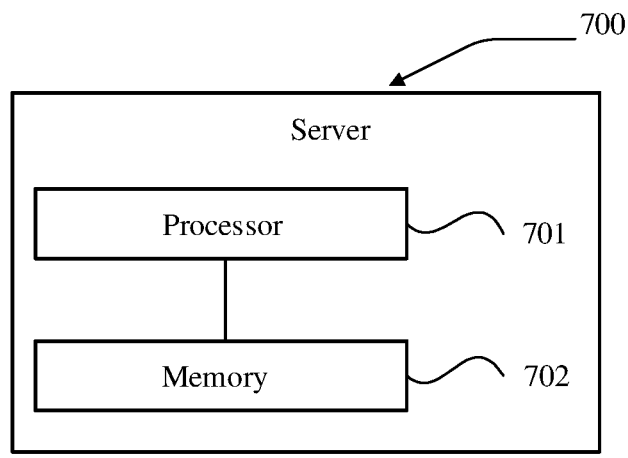
FIG. 7 is a schematic structural diagram of a server according to an embodiment.

FIG. 7 is a schematic structural diagram of a server according to an embodiment. The server 700 may be of much difference due to different configurations or performance. In some embodiments, the server includes at least one Central Processing Unit (CPU) 701 and at least one memory 702. At least one instruction is stored in the memory 702 and is loaded and executed by the CPU 701 to implement the methods according to the foregoing method embodiments. Certainly, in some embodiments, the server is also provided with such components as a wired or wireless network interface, a keyboard and an I/O interface to facilitate input and output. In some embodiments, the server also includes other components for implementing device functions, which is not described herein any further.

Both of the terminal 600 and the server 700 may be regarded as an electronic device configured to execute instructions for: acquiring classification identifiers of a plurality of pixel points in a target human face image, wherein the classification identifier includes a first identifier of pixel points in a first human face part or a second identifier of pixel points in a second human face part; determining a target region in the target human face image based on the classification identifiers, wherein the target region is a region belonging to the first human face part; and adding a virtual item to the target region; wherein the first human face part includes an uncovered human face part, and the second human face part includes a covered human face part or a non-human face part.

In some embodiments, acquiring the classification identifiers of the plurality of pixel points in the target human face image includes: acquiring features of the target human face image by extracting the feature from the target human face image based on a pixel classification model; and determining the classification identifiers of pixel points in the target human face image based on the features of the target human face image.

In some embodiments, determining the target region in the target human face image includes: acquiring a first reference image based on the classification identifiers, wherein pixel values of pixel points in the first reference image are determined by the classification identifiers; determining a reference region in the first reference image, wherein the reference region includes pixel points with the first identifier; and determining the target region according to the reference region in the target human face image.

In some embodiments, acquiring the first reference image includes: determining a second reference image, wherein pixel values of pixel points in the second reference image are classification identifiers; and acquiring the first reference image by smoothing the second reference image.

In some embodiments, acquiring the classification identifiers of the plurality of pixel points in the target human face image includes: detecting key pixel points belonging to a human face part in the target human face image; determining a first human face image, wherein the first human face image includes a region composed by key pixel points; and determining classification identifiers of pixel points in the first human face image.

In some embodiments, said determining the first human face image includes: acquiring edge pixel points of key pixel points in response to the key pixel points being located within a region of a human face part, wherein the edge pixel points are located on a contour of the human face part; and determining the first human face image including the region connected by the edge pixel points.

In some embodiments, said determining the target region in the target human face image includes: acquiring a third reference image based on classification identifiers of pixel points in the first human face image, wherein pixel values of pixel points in the third reference image are determined based on the classification identifiers of pixel points in the first human face image; acquiring a fourth reference image by adding reference pixel points to outer side of the third reference image, wherein pixel values of the reference pixel points are the second identifier, the fourth reference image and the target human face image have the same size, and a location of each pixel point of the third reference image in the fourth reference image is the same as a location of a corresponding pixel point of the first human face image in the target human face image; determining a reference region in the fourth reference image; and determining, in the target human face image, a target region corresponding to the reference region, wherein the reference region includes pixel points with pixel values being the first identifier in the fourth reference image.

In some embodiments, said acquiring the third reference image includes: determining a fifth reference image, wherein pixel values of pixel points in the fifth reference image are classification identifiers; and acquiring the third reference image by smoothing the fifth reference image.

In some embodiments, said adding the virtual item to the target region includes: acquiring a reference image, wherein pixel values of pixel points in the reference image are determined by classification identifiers; acquiring a first matrix, a second matrix, a third matrix and a fourth matrix, wherein elements of the first matrix are equal to pixel values of pixel points with same position in the target human face image; the second matrix has same size as the first matrix and all elements of the second matrix are equal to 1; elements of the third matrix are equal to pixel values of pixel points with same position in the reference image; elements of the fourth matrix are equal to pixel values of pixel points with same position in the virtual item; acquiring a fifth matrix based on the first matrix, the second matrix, the third matrix and the fourth matrix: $z=x*(a-mask)+y*mask$, wherein z is the fifth matrix, x is the first matrix, a is the second matrix, y is the third matrix, and mask is the fourth matrix; and generating, based on to the fifth matrix, a target human face image added with the virtual item, wherein pixel values of pixel points in each location of the target human face image are equal to elements in the same location of the fifth matrix.

An embodiment further provides a non-temporary computer-readable storage medium storing at least one program including at least one instruction. The at least one instruction, when executed by a processor of an electronic device, causes the electronic device to perform a method including: acquiring classification identifiers of a plurality of pixel points in a target human face image, wherein the classification identifier includes a first identifier of pixel points in a first human face part or a second identifier of pixel points in a second human face part; determining a target region in the target human face image based on the classification identifiers, wherein the target region is a region belonging to the first human face part; and adding a virtual item to the target region; wherein the first human face part includes an uncovered human face part, and the second human face part includes a covered human face part or a non-human face part.

In some embodiments, acquiring the classification identifiers of the plurality of pixel points in the target human face image includes: acquiring features of the target human face image by extracting the feature from the target human face image based on a pixel classification model; and determining the classification identifiers of pixel points in the target human face image based on the features of the target human face image.

In some embodiments, determining the target region in the target human face image includes: acquiring a first reference image based on the classification identifiers, wherein pixel values of pixel points in the first reference image are determined by the classification identifiers; determining a reference region in the first reference image, wherein the reference region includes pixel points with the first identifier; and determining the target region according to the reference region in the target human face image.

In some embodiments, acquiring the first reference image includes: determining a second reference image, wherein pixel values of pixel points in the second reference image are classification identifiers; and acquiring the first reference image by smoothing the second reference image.

In some embodiments, acquiring the classification identifiers of the plurality of pixel points in the target human face image includes: detecting key pixel points belonging to a human face part in the target human face image; determining a first human face image, wherein the first human face image includes a region composed by key pixel points; and determining classification identifiers of pixel points in the first human face image.

In some embodiments, said determining the first human face image includes: acquiring edge pixel points of key pixel points in response to the key pixel points being located within a region of a human face part, wherein the edge pixel points are located on a contour of the human face part; and determining the first human face image including the region connected by the edge pixel points.

In some embodiments, said determining the target region in the target human face image includes: acquiring a third reference image based on classification identifiers of pixel points in the first human face image, wherein pixel values of pixel points in the third reference image are determined based on the classification identifiers of pixel points in the first human face image; acquiring a fourth reference image by adding reference pixel points to outer side of the third reference image, wherein pixel values of the reference pixel points are the second identifier, the fourth reference image and the target human face image have the same size, and a location of each pixel point of the third reference image in the fourth reference image is the same as a location of a corresponding pixel point of the first human face image in the target human face image; determining a reference region in the fourth reference image; and determining, in the target human face image, a target region corresponding to the reference region, wherein the reference region includes pixel points with pixel values being the first identifier in the fourth reference image.

In some embodiments, said acquiring the third reference image includes: determining a fifth reference image, wherein pixel values of pixel points in the fifth reference image are classification identifiers; and acquiring the third reference image by smoothing the fifth reference image.

In some embodiments, said adding the virtual item to the target region includes: acquiring a reference image, wherein pixel values of pixel points in the reference image are determined by classification identifiers; acquiring a first matrix, a second matrix, a third matrix and a fourth matrix, wherein elements of the first matrix are equal to pixel values of pixel points with same position in the target human face image; the second matrix has same size as the first matrix and all elements of the second matrix are equal to 1; elements of the third matrix are equal to pixel values of pixel points with same position in the reference image; elements of the fourth matrix are equal to pixel values of pixel points with same position in the virtual item; acquiring a fifth matrix based on the first matrix, the second matrix, the third matrix and the fourth matrix: z=x*(a−mask)+y*mask, wherein z is the fifth matrix, x is the first matrix, a is the second matrix, y is the third matrix, and mask is the fourth matrix; and generating, based on to the fifth matrix, a target human face image added with the virtual item, wherein pixel values of pixel points in each location of the target human face image are equal to elements in the same location of the fifth matrix.

An embodiment provides a computer program product storing at least one instruction therein. The at least one instruction, when executed by a processor of an electronic device, causes the electronic device to perform the steps performed by the apparatus for adding the virtual item.

Other embodiments of the present disclosure are apparent to those skilled in the art from consideration of the description and practice of the present disclosure. The present disclosure is intended to cover any variations, uses, or adaptations of the present disclosure following the general principles thereof and including common knowledge or commonly used technical measures which are not disclosed herein. The description and embodiments are to be considered as examples only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for adding a virtual item, comprising:
  acquiring classification identifiers of a plurality of pixel points in a target human face image, wherein the classification identifiers comprise a first identifier of pixel points in a first human face part or a second identifier of pixel points in a second human face part;
  determining a target region in the target human face image based on the classification identifiers, wherein the target region is a region belonging to the first human face part; and
  adding a virtual item to the target region;
  wherein the first human face part comprises an uncovered human face part, and the second human face part comprises a covered human face part or a non-human face part;
  wherein said adding the virtual item to the target region comprises:
    acquiring a reference image, wherein pixel values of pixel points in the reference image are determined by the classification identifiers;
    acquiring a first matrix, a second matrix, a third matrix and a fourth matrix, wherein:
      elements of the first matrix are equal to pixel values of pixel points with same positions in the target human face image;
      the second matrix has same size as the first matrix, and all elements of the second matrix are equal to 1;
      elements of the third matrix are equal to pixel values of pixel points with same positions in the reference image; and
      elements of the fourth matrix are equal to pixel values of pixel points with same positions in the virtual item; and
    generating, based on the first matrix, the second matrix, the third matrix and the fourth matrix, the target human face image added with the virtual item.

2. The method according to claim 1, wherein said acquiring the classification identifiers of the plurality of pixel points in the target human face image comprises:
  acquiring features of the target human face image by extracting the features from the target human face image based on a pixel classification model; and
  determining the classification identifiers of the plurality of pixel points in the target human face image based on the features of the target human face image.

3. The method according to claim 1, wherein said determining the target region in the target human face image comprises:
  acquiring a first reference image based on the classification identifiers, wherein pixel values of pixel points in the first reference image are determined by the classification identifiers;
  determining a reference region in the first reference image, wherein the reference region comprises pixel points with the first identifier; and
  determining the target region according to the reference region in the target human face image.

4. The method according to claim 1, wherein determining the target region in the target human face image comprises:
  acquiring a first reference image based on the classification identifiers, wherein pixel values of pixel points in the first reference image are determined by the classification identifiers;
  acquiring a second reference image by smoothing the first reference image;
  determining a reference region in the second reference image, wherein the reference region comprises pixel points with the first identifier; and
  determining the target region according to the reference region in the target human face image.

5. The method according to claim 1, wherein said acquiring the classification identifiers of the plurality of pixel points in the target human face image comprises:
  detecting key pixel points belonging to a human face part in the target human face image;
  determining a first human face image, wherein the first human face image comprises a region composed by the key pixel points; and
  determining classification identifiers of pixel points in the first human face image.

6. The method according to claim 5, wherein said determining the first human face image comprises:
  acquiring edge pixel points of the key pixel points in response to the key pixel points being located within a region of the human face part, wherein the edge pixel points are located on a contour of the human face part; and
  determining the first human face image comprising the region connected by the edge pixel points.

7. The method according to claim 5, wherein said determining the target region in the target human face image comprises:
  acquiring a third reference image based on the classification identifiers of the pixel points in the first human face image, wherein pixel values of pixel points in the third reference image are determined based on the classification identifiers of the pixel points in the first human face image;
  acquiring a fourth reference image by adding reference pixel points to outer side of the third reference image, wherein pixel values of the reference pixel points are related to the second identifier, the fourth reference image and the target human face image have same sizes, and a location of each pixel point of the third reference image in the fourth reference image is same as a location of a corresponding pixel point of the first human face image in the target human face image;

determining a reference region in the fourth reference image; and determining, in the target human face image, a target region corresponding to the reference region, wherein the reference region comprises pixel points with pixel values being related to the first identifier in the fourth reference image.

8. The method according to claim 5, wherein said determining the target region in the target human face image comprises:

acquiring a third reference image based on the classification identifiers of the pixel points in the first human face image, wherein pixel values of pixel points in the third reference image are determined based on the classification identifiers of the pixel points in the first human face image;

acquiring a fifth reference image by smoothing the third reference image;

acquiring a sixth reference image by adding reference pixel points to outer side of the fifth reference image, wherein pixel values of the reference pixel points are related to the second identifier, the sixth reference image and the target human face image have same sizes, and a location of each pixel point of the fifth reference image in the sixth reference image is same as a location of a corresponding pixel point of the first human face image in the target human face image;

determining a reference region in the sixth reference image; and determining, in the target human face image, a target region corresponding to the reference region, wherein the reference region comprises pixel points with pixel values being related to the first identifier in the sixth reference image.

9. The method according to claim 1, wherein said generating, based on the first matrix, the second matrix, the third matrix and the fourth matrix, the target human face image added with the virtual item comprises:

acquiring a fifth matrix based on: (i) the first matrix, the second matrix, the third matrix and the fourth matrix, and (ii) z=x*(a−mask)+y*mask, wherein the z is the fifth matrix, the x is the first matrix, the a is the second matrix, the y is the third matrix, and the mask is the fourth matrix; and generating, based on the fifth matrix, the target human face image added with the virtual item, wherein pixel values of pixel points in each location of the target human face image are equal to elements in a same location of the fifth matrix.

10. An electronic device for adding a virtual item, comprising:

at least one processor; and a volatile or non-volatile memory configured to store at least one program comprising at least one instruction executable by the at least one processor;

wherein the at least one instruction, when executed by the at least one processor, causes the at least one processor to perform a method comprising:

acquiring classification identifiers of a plurality of pixel points in a target human face image, wherein the classification identifiers comprise a first identifier of pixel points in a first human face part or a second identifier of pixel points in a second human face part;

determining a target region in the target human face image based on the classification identifiers, wherein the target region is a region belonging to the first human face part; and adding a virtual item to the target region;

wherein the first human face part comprises an uncovered human face part, and the second human face part comprises a covered human face part or a non-human face part;

wherein said adding the virtual item to the target region comprises:

acquiring a reference image, wherein pixel values of pixel points in the reference image are determined by the classification identifiers;

acquiring a first matrix, a second matrix, a third matrix and a fourth matrix, wherein:

elements of the first matrix are equal to pixel values of pixel points with same positions in the target human face image;

the second matrix has same size as the first matrix, and all elements of the second matrix are equal to 1;

elements of the third matrix are equal to pixel values of pixel points with same positions in the reference image; and elements of the fourth matrix are equal to pixel values of pixel points with same positions in the virtual item; and generating, based on the first matrix, the second matrix, the third matrix and the fourth matrix, the target human face image added with the virtual item.

11. The electronic device according to claim 10, wherein said acquiring the classification identifiers of the plurality of pixel points in the target human face image comprises:

acquiring features of the target human face image by extracting the features from the target human face image based on a pixel classification model; and determining the classification identifiers of the plurality of pixel points in the target human face image based on the features of the target human face image.

12. The electronic device according to claim 10, wherein said determining the target region in the target human face image comprises:

acquiring a first reference image based on the classification identifiers, wherein pixel values of pixel points in the first reference image are determined by the classification identifiers;

determining a reference region in the first reference image, wherein the reference region comprises pixel points with the first identifier; and determining the target region according to the reference region in the target human face image.

13. The electronic device according to claim 10, wherein said determining the target region in the target human face image comprises:

acquiring a first reference image based on the classification identifiers, wherein pixel values of pixel points in the first reference image are determined by the classification identifiers;

acquiring a second reference image by smoothing the first reference image;

determining a reference region in the second reference image, wherein the reference region comprises pixel points with the first identifier; and determining the target region according to the reference region in the target human face image.

14. The electronic device according to claim 10, wherein said acquiring the classification identifiers of the plurality of pixel points in the target human face image comprises:

detecting key pixel points belonging to a human face part in the target human face image;

determining a first human face image, wherein the first human face image comprises a region composed by the key pixel points; and determining classification identifiers of pixel points in the first human face image.

15. The electronic device according to claim 14, wherein said determining the first human face image comprises:

acquiring edge pixel points of the key pixel points in response to the key pixel points being located within a region of the human face part, wherein the edge pixel points are located on a contour of the human face part; and determining the first human face image comprising the region connected by the edge pixel points.

16. The electronic device according to claim 14, wherein said determining the target region in the target human face image comprises:

acquiring a third reference image based on the classification identifiers of the pixel points in the first human face image, wherein pixel values of pixel points in the third reference image are determined based on the classification identifiers of the pixel points in the first human face image;

acquiring a fourth reference image by adding reference pixel points to outer side of the third reference image, wherein pixel values of the reference pixel points are related to the second identifier, the fourth reference image and the target human face image have same sizes, and a location of each pixel point of the third reference image in the fourth reference image is same as a location of a corresponding pixel point of the first human face image in the target human face image;

determining a reference region in the fourth reference image; and determining, in the target human face image, a target region corresponding to the reference region, wherein the reference region comprises pixel points with pixel values being related to the first identifier in the fourth reference image.

17. The electronic device according to claim 14, wherein said determining the target region in the target human face image comprises:

acquiring a third reference image based on the classification identifiers of the pixel points in the first human face image, wherein pixel values of pixel points in the third reference image are determined based on the classification identifiers of the pixel points in the first human face image;

acquiring a fifth reference image by smoothing the third reference image;

acquiring a sixth reference image by adding reference pixel points to outer side of the fifth reference image, wherein pixel values of the reference pixel points are related to the second identifier, the sixth reference image and the target human face image have same sizes, and a location of each pixel point of the fifth reference image in the sixth reference image is same as a location of a corresponding pixel point of the first human face image in the target human face image;

determining a reference region in the sixth reference image; and determining, in the target human face image, a target region corresponding to the reference region, wherein the reference region comprises pixel points with pixel values being related to the first identifier in the sixth reference image.

18. The electronic device according to claim 10, wherein said generating, based on the first matrix, the second matrix, the third matrix and the fourth matrix, the target human face image added with the virtual item comprises:

acquiring a fifth matrix based on: (i) the first matrix, the second matrix, the third matrix and the fourth matrix, and (ii) $z=x*(a-mask)+y*mask$, wherein the z is the fifth matrix, the x is the first matrix, the a is the second matrix, the y is the third matrix, and the mask is the fourth matrix; and generating, based on the fifth matrix, the target human face image added with the virtual item, wherein pixel values of pixel points in each location of the target human face image are equal to elements in a same location of the fifth matrix.

19. A non-transitory computer-readable storage medium storing at least one program comprising at least one instruction therein, wherein the at least one instruction, when executed by a processor of an electronic device, causes the electronic device to perform a method comprising:

acquiring classification identifiers of a plurality of pixel points in a target human face image, wherein the classification identifiers comprise a first identifier of pixel points in a first human face part or a second identifier of pixel points in a second human face part;

determining a target region in the target human face image based on the classification identifiers, wherein the target region is a region belonging to the first human face part; and adding a virtual item to the target region;

wherein the first human face part comprises an uncovered human face part, and the second human face part comprises a covered human face part or a non-human face part;

wherein said adding the virtual item to the target region comprises:

acquiring a reference image, wherein pixel values of pixel points in the reference image are determined by the classification identifiers;

acquiring a first matrix, a second matrix, a third matrix and a fourth matrix, wherein:

elements of the first matrix are equal to pixel values of pixel points with same positions in the target human face image;

the second matrix has same size as the first matrix, and all elements of the second matrix are equal to 1;

elements of the third matrix are equal to pixel values of pixel points with same positions in the reference image; and elements of the fourth matrix are equal to pixel values of pixel points with same positions in the virtual item; and generating, based on the first matrix, the second matrix, the third matrix and the fourth matrix, the target human face image added with the virtual item.

20. The non-transitory computer-readable storage medium according to claim 19, wherein said acquiring the classification identifiers of the plurality of pixel points in the target human face image comprises:
- acquiring features of the target human face image by extracting the features from the target human face image based on a pixel classification model; and
- determining the classification identifiers of the plurality of pixel points in the target human face image based on the features of the target human face image.

* * * * *